United States Patent

Bock, deceased

[15] 3,656,374
[45] Apr. 18, 1972

[54] METHOD OF MILLING AND HOBBING ROLLS FOR THE MANUFACTURE OF RODS

[72] Inventor: Ernst Bock, deceased, late of Peine, Germany by said Ingeborg Bock, administratrix

[73] Assignee: Ilseder Hutte, Peine, Germany

[22] Filed: Feb. 26, 1970

[21] Appl. No.: 14,518

[52] U.S. Cl. ............................76/101 R, 72/198, 90/4
[51] Int. Cl. ......................................................B21k 21/00
[58] Field of Search .....................76/101 R; 90/4; 72/198
[56] References Cited

UNITED STATES PATENTS 2,377,980  6/1945  Surerus..................................72/198

Primary Examiner—Bernard Stickney
Attorney—Karl F. Ross

[57] ABSTRACT

A deep circumferential groove is formed around a roll. The edges of this groove are chamfered, and threading formations are hob milled into the base and walls of the groove so that the mill teeth are not chipped away by impact with sharp edges of the groove. Thereafter the roll is machined down to eliminate the chamfers and reduce the diameter to the desired size. The thread-like formations in the groove of the rolls produce concrete reinforcement and like rods with helical thread-like ribs.

7 Claims, 4 Drawing Figures

INVENTORS
ERNST BOCK, DECEASED
BY: INGEBORG BOCK, ADMINISTRATRIX
BY
Karl F. Ross
Attorney INVENTORS
ERNST BOCK, DECEASED
BY: INGEBORG BOCK, ADMINISTRATRIX
BY
Karl F. Ross
Attorney

METHOD OF MILLING AND HOBBING ROLLS FOR THE MANUFACTURE OF RODS

The present invention relates to a method of milling a roll and, more particularly, of milling a roll used to manufacture threaded rod.

Threaded round rod is used in the reinforcing and/or stressing of concrete. The rod is connected to anchors and stressed and then set in concrete; the rod may be provided with a nut and usually a washer on each end so that, when the concrete is fully hardened, it can be released from its anchors or the anchors left in place to impart a stress to the concrete. Thread-like rib formations may also be used to anchor the form-work preparatory to casting and as means restricting the tendency of the rod to shift within the hardened body. Two such rods are also often longitudinally joined by simply screwing them into opposite ends of an internally threaded sleeve.

In virtually all cases these rods are made of iron or steel and are threaded during a rolling process by being passed between at least one pair of rolls which are formed with facing circumferential grooves that are of substantially semicircular cross section and together define helical grooves which are pressed about the rod.

The threads so formed must have a high degree of accuracy throughout the entire length of the rod, since the rods are often cut, with the nut threaded on at the cut portion. Actually the threads so formed are usually merely matching helical ribs on the rod surface. It will be understood that, when the term "threads" is used herein any equivalent ribbing is also contemplated. The rolls used to produce such threaded rod have a relatively short service lift; their frequent renewal or replacement is a major expense which greatly contributes to the ultimate rod cost.

These rolls are usually produced by forming the roll with at least one circumferential groove of substantially semicircular cross section and of a depth equal to the radius of the finished rod less half of any gap between the rolls of the assembled installation. The groove can be formed separately or during the original lathe-turning of the rolls.

The thread-forming helicoidal recesse are then cut into the walls of these grooves by means of hob milling.

For this operation a fluted worm or hob mill, resembling a common machine-screw tap, of hard steel or like relatively brittle but low-wear tool-making material is rotated about its own axis while in contact with and extending across the roll at the groove. The hob is then radially displaced toward the roll axis until the threading formations have the desired depth.

The hob is an extremely expensive item, since it must be machined, by time-consuming methods and skilled workers, to extremely fine tolerances and is made of hard steel or like material difficult to work. As it is pushed against the workpiece, there is a tendency for it to jump and chatter, which causes it to chip and wear out after an economically disadvantageous period. Slowing down the milling spead does reduce wear, but also makes manufacture in general slower and costlier.

It is, therefore, an object of the present invention to provide an improved method of milling a roll.

A more specific object is to provide such a method which is applicable to rolls usable for threading rods, such as concrete-stressing or concrete-reinforcing rods.

The above objects are attained, in accordance with a feature of the present invention, with a method wherein, at turning the groove originally formed in the roll is made substantially deeper than required for the final roll configuration. Then the sharp edges or flanks of this deep groove are chamfered or beveled, and the threads are hob milled into the walls and base of the groove. Once the threads are thus formed, the roll is finish machined, e.g. by turning down to eliminate the chamfers and reduce the depth of the groove to the desired level. The original radius of the roll is thus made greater than the final radius by a height equal to that of the chamfer which, in turn, is between 1/5 and ½ the groove diameter and approximately equal to the depth of the formations to be cut therein.

This novel method is based on the principle that the hob wears out excessively quickly because the threads at the edges of the flutes strike the sharp edges of the groove in the hard steel roller and quickly wear off. When the hub is radially pushed into a groove with chamfered edges, the contact between this hob and the roll is mainly tangential rather than flat as with the prior-art methods. This brings about a substantial increase in the service life of the extremely costly hob, one which more than compensates for the two additional steps of chamfering the groove edges and then machining down the roll.

The above and other objects, features, and advantages will become apparent from the following description, reference being made to the accompanying drawing, in which.

Figure 1:
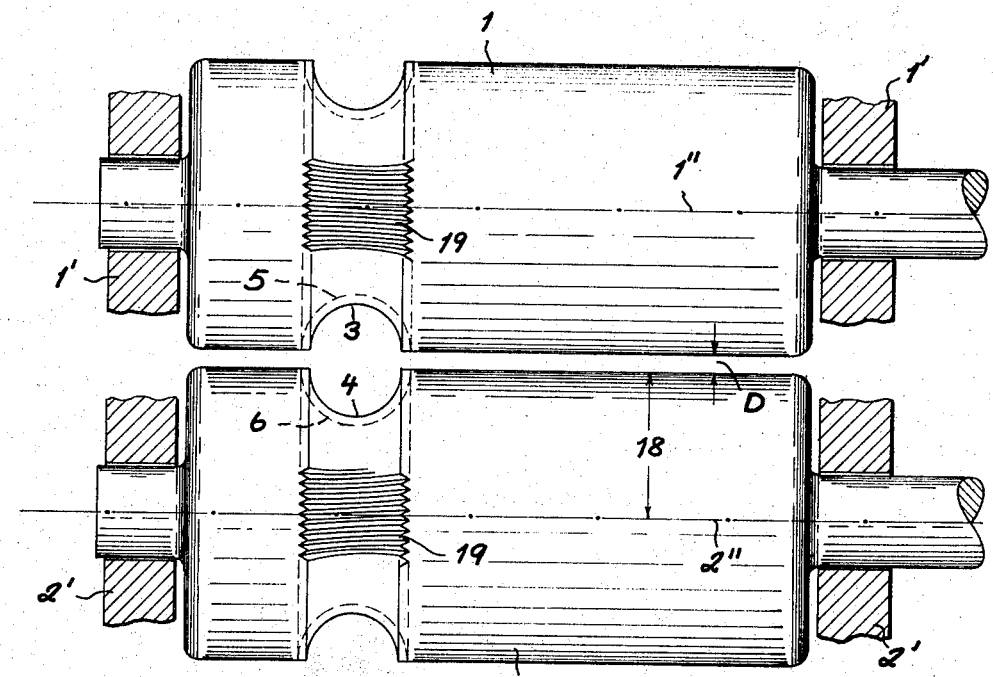
FIG. 1 is an end view of a pair of rolls according to the present invention.

As shown in FIG. 1, a pair of hard steel rolls 1 and 2 are mounted in respective bearings 1' and 2' and are formed with respective circumferential grooves 3 and 4 formed with thread-cutting formations to a depth shown by dot-dash semicircles 5 and 6. The rolls 1 and 2 are rotatable about respective axes 1" and 2" and are separated by a gap D. Thus, the rolls have a radius 18, and the grooves 3 and 4 are not fully semicircles, as will be described more fully below with reference to FIG. 2.

Figure 2:
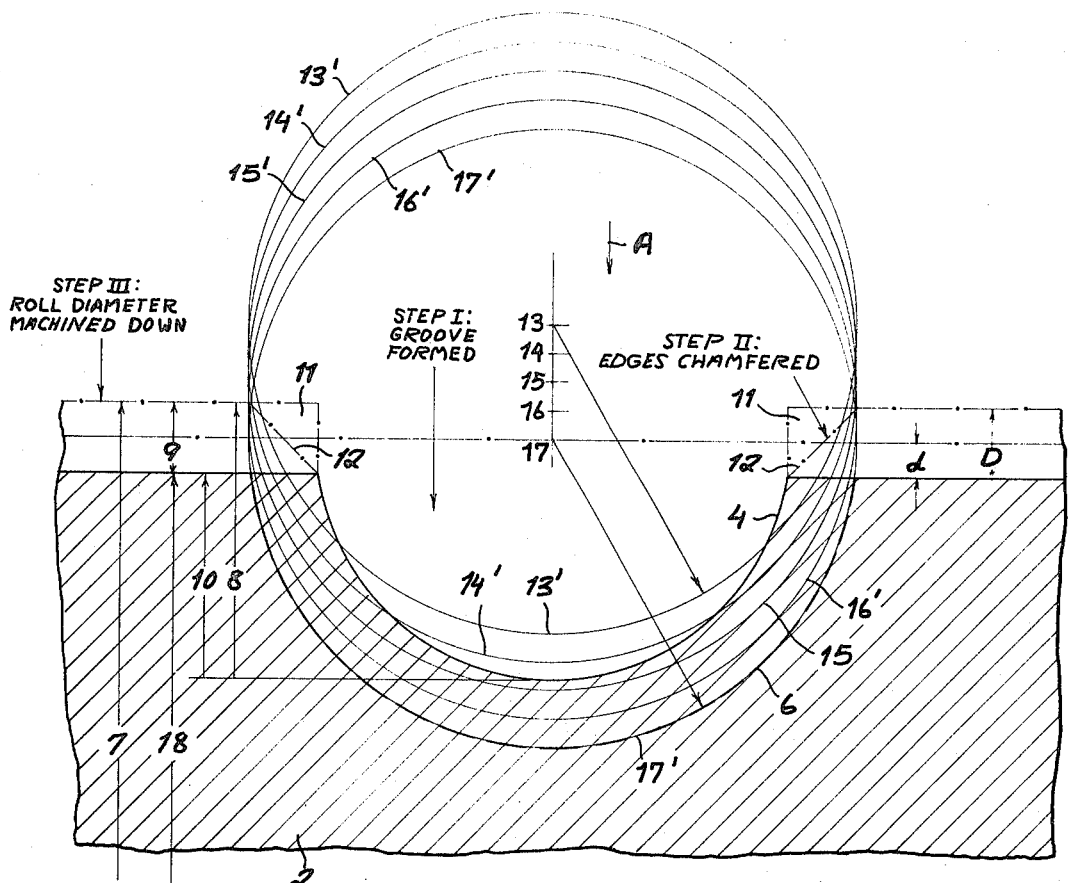
FIG. 2 is a sectional detail view showing one roll and illustrating the different steps of the invention.

Dot-dash lines indicate the original dimensions of the roll 2 as shown in FIG. 2. The original radius 7 of the roll 2 is greater than the final radius 18 by a distance 9 equal to the distance D. A groove 4 of depth 8 is formed in this roll by turning, the depth 8 being greater than the radius of curvature of the groove 4. Then edges 11 of the deep groove 4 are chamfered off at a 45° angle along the lines 12 of FIG. 2 after formation of the groove.

Figure 3:
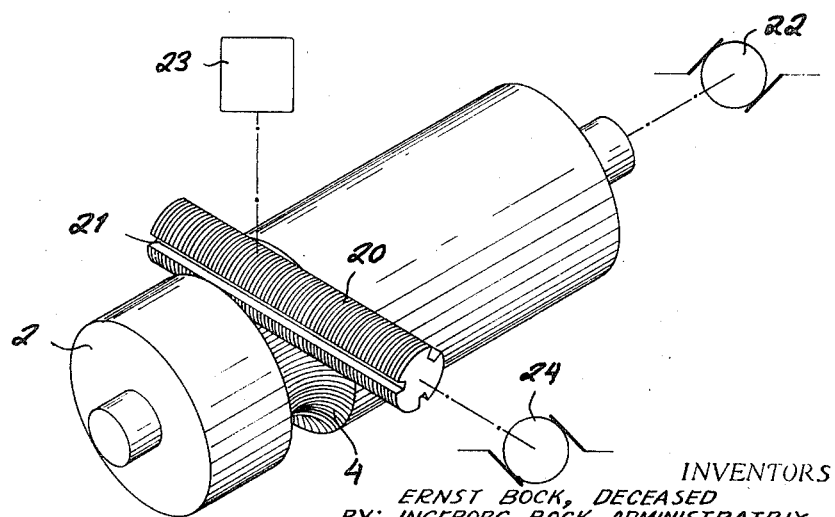
FIG. 3 is a perspective view showing how the roll is hob milled according to the present invention.

Finally, as also shown in FIG. 3, threads 19 are milled into the groove 4 by a hob 29. The roll 2 is rotated by a motor 24 and the hob 20 by a motor 22. FIG. 2 shows the original center of the hob at 13 and its outer orbit at 13'. A motor 23 serves to displace the rotating hob 20 radially toward the roll 2 so that its center moves through points 13, 14, 15, 16 to end up at point 17, and the circumference correspondingly is found at lines 13'– 17'. It should be clear that at no time in the hob milling process do the edges of the hob blades at the flutes 21 strike directly and flatly against the edge of the groove 2. Rather, the hob blades strike the chamfer 12 tangentially so that the shock, and thus the wear, is substantially reduced.

After the threads 19 have been milled into the groove 4 to the desired depth, equal to the axial length and radial height of the chamfers 12, the entire roll is turned down until it has the radius 18. As this thickness the chamfers 11 are entirely removed and the groove 4 had a depth 10 which is less than its radius of curvature by a distance $d$ equal to D/2.

Figure 4:
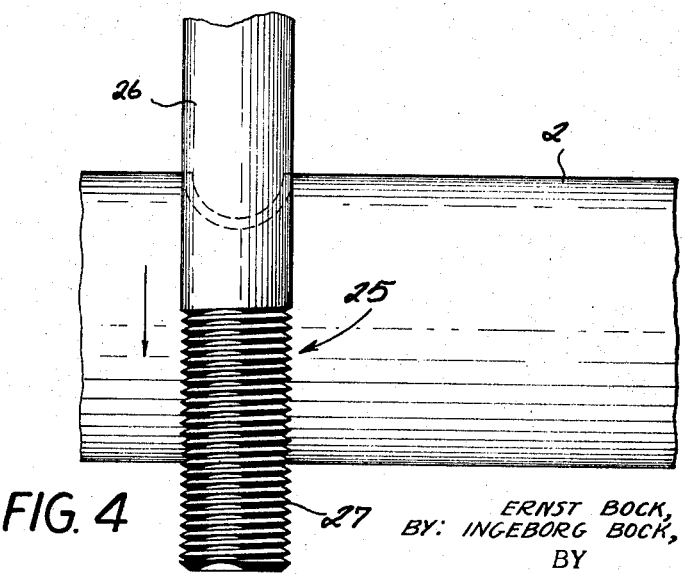
FIG. 4 is a perspective view showing a partially threaded rod.

The rod to be threaded is simply passed between two rolls machined as shown in FIGS. 2 and 3 one or more times. FIG. 4 shows a rod 25 whose lower end 27 is threaded according to the invention, and whose upper end 26 is yet to pass over the roll 2.

It is worth stressing that the reinforcing rod so rolled is not formed with a single, continuous helical thread, but with, to each side of a plane through the rod axis, ribs which lie on an imaginary axially extending helix. The gap D between the rolls is reproduces as a blank area extending axially up each side of the rod between the rib-like formations 19.

What is claimed is:

1. A method of milling a roll for the manufacture of threaded rod, said method comprising the steps of:
    forming a circumferential round-bottomed groove around said roll;
    chamfering the edges of said groove;

hob milling said groove to cut threading formations therein; and externally machining said roll to reduce the diameter and substantially eliminate the chamfers.

2. The method defined in claim 1 wherein, after the external machining of said roll, said groove is substantially semicircular in cross section.

3. The method defined in claim 1 wherein said chamfers are cut at an angle of substantially 45° to the roll axis.

4. The method defined in claim 1 wherein said roll is externally machined to reduce its radius by a distance equal to the radial height of said chamfers.

5. The method defined in claim 1 wherein said chamfers have an axial length equal to the depth to which said roll is hob milled.

6. The method defined in claim 3 wherein said chamfers have a radial height of said formations.

7. The method defined in claim 6 wherein said radial height of said chamfers is substantially 1/5 to ½ the depth of said groove.

* * * * *